United States Patent
Creager et al.

(10) Patent No.: US 10,649,653 B2
(45) Date of Patent: May 12, 2020

(54) VIRTUAL KEYBOARD

(71) Applicant: Hewlett-Packard Development Company, L.P., Houston, TX (US)

(72) Inventors: Gregory Doyle Creager, Boise, ID (US); Antonio Roberto Tijerino, Eagle, ID (US); Shaun Henry, Middleton, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 295 days.

(21) Appl. No.: 15/325,528

(22) PCT Filed: Jul. 15, 2014

(86) PCT No.: PCT/US2014/046715
§ 371 (c)(1),
(2) Date: Jan. 11, 2017

(87) PCT Pub. No.: WO2016/010524
PCT Pub. Date: Jan. 21, 2016

(65) Prior Publication Data
US 2017/0153812 A1     Jun. 1, 2017

(51) Int. Cl.
| | |
|---|---|
| *G09G 1/00* | (2006.01) |
| *G06F 3/0488* | (2013.01) |
| *G06F 3/03* | (2006.01) |
| *G06F 3/02* | (2006.01) |
| *G06F 3/01* | (2006.01) |

(Continued)

(52) U.S. Cl.
CPC ......... *G06F 3/04886* (2013.01); *G06F 3/011* (2013.01); *G06F 3/0202* (2013.01); *G06F 3/0233* (2013.01); *G06F 3/0304* (2013.01); *G06F 3/0346* (2013.01); *G06F 21/316* (2013.01)

(58) Field of Classification Search
CPC .......... G06F 3/023; G06F 3/0346; G06F 3/01; G06F 3/048
See application file for complete search history.

(56) References Cited

U.S. PATENT DOCUMENTS

| | | |
|---|---|---|
| 6,650,318 B1 | 11/2003 | Arnon |
| 7,701,364 B1 | 4/2010 | Zilberman |

(Continued)

FOREIGN PATENT DOCUMENTS

| | | |
|---|---|---|
| TW | I275979 | 3/2007 |
| WO | WO-2014/083370 A1 | 6/2014 |

OTHER PUBLICATIONS

Lukas Mathis, "Virtual Keyboards: Aligning the Keyboard to Your Hands," Sep. 28, 2009, pp, 1-3, Ignore the Code Blog, <ignorethecode.net/>.

(Continued)

*Primary Examiner* — Michael A Faragalla
(74) *Attorney, Agent, or Firm* — Fabian VanCott

(57) ABSTRACT

A virtual keyboard includes a pad, a number of motion sensors coupled to the pad to detect the presence of a user's hands over the pad, a processor, and a memory. The memory includes executable code that, when executed by the processor calibrates the virtual keyboard based on a number of criteria of the user's hand upon detection of the user's hands by the motion sensors, in which the criteria comprises the user's unique keyboard profile.

14 Claims, 5 Drawing Sheets

(51) Int. Cl.
*G06F 3/023* (2006.01)
*G06F 3/0346* (2013.01)
*G06F 21/31* (2013.01)

(56) References Cited

U.S. PATENT DOCUMENTS

| | | |
|---|---|---|
| 8,300,023 B2 | 10/2012 | Forutanpour et al. |
| 8,446,389 B2 | 5/2013 | Challener et al. |
| 8,514,188 B2 | 8/2013 | Hoover et al. |
| 8,723,800 B2 | 5/2014 | Lin |
| 2005/0225538 A1 | 10/2005 | Verhaegh |
| 2009/0303200 A1 | 12/2009 | Grad |
| 2012/0260207 A1* | 10/2012 | Treskunov .......... G06F 3/04886 715/773 |
| 2013/0109369 A1* | 5/2013 | Forutanpour ........ A61B 5/1072 455/418 |
| 2013/0127729 A1 | 5/2013 | Mosby et al. |
| 2013/0257732 A1 | 10/2013 | Duffield |
| 2014/0298266 A1* | 10/2014 | Lapp .................. G06F 3/04886 715/835 |

OTHER PUBLICATIONS

Paul Ridden, "LiquidKeyboard Said to Make Tablet Touch-typing a Might Easier," Gizmag, Jan. 26, 2011, pp. 1-4.
Virtual Keyboard: Laser Projection Keyboard Lets You Type on Flat Surfaces, Brookstone 2012, pp. 1-2, Available at: <brookstone.com/laser-projection-virtual-keyboard>.

* cited by examiner

VIRTUAL KEYBOARD

BACKGROUND

Computer keyboards are typewriter-style devices that use an arrangement of buttons or keys with a number of alphanumeric characters, graphemes, symbols, and, other types of characters printed or engraved on the buttons or keys. The buttons and keys act as mechanical levers or electronic switches that cause input of a character to a computing device or otherwise control a computing device to which the keyboard is communicatively coupled. Keyboards, however, are bulky and are not easily mobile. Keyboards also contain mechanical parts that are easily broken. In addition, a user of a keyboard must strike the buttons or keys as they are laid out on the keyboard with no ability to fit the layout of the keyboard to a user. Even if customized keyboards were produced, such customized keyboards would be disadvantageous in shared computing environments such as workshops and call centers were several individuals may use the same keyboard. Further, keyboards provide no form of user authentication to secure and protect data on an associated computing device from unauthorized access. Still further, keyboards increase the potential to suffer from injuries or illnesses such as carpal tunnel syndrome or other repetitive strain injury and illness due to the extensive spread of bacteria.

BRIEF DESCRIPTION OF THE DRAWINGS

The accompanying, drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

The present systems and methods provide a virtual keyboard that detects user's hands over the virtual keyboard and maps a number of virtual input keys to the user's hands and builds a unique keyboard profile for authentication purposes and character entry. The virtual keyboard is communicatively coupled to a computing device to provide for data input to the computing device control the computing device to which the virtual keyboard is communicatively coupled. The virtual keyboard comprises a pad, a number of motion sensors coupled to the pad to detect the presence of a user's hands over the pad, and a tracking system to track hand and finger movements of the user's hand. In this manner, the user does not touch any hardware device when utilizing the virtual keyboard. Detection of the user's hands by the motion sensors activates the tracking system. The tracking system comprises a number of wave detectors to detect wavelengths reflected off the user's hands. The wave detectors may, for example, detect electromagnetic wavelengths or acoustical frequencies. The virtual keyboard may be calibrated to a user's hand positioning, hand size, or any other criteria to define a keyboard profile unique to that user. This keyboard profile may be used to identify the user as well as provide a number of security and access controls.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
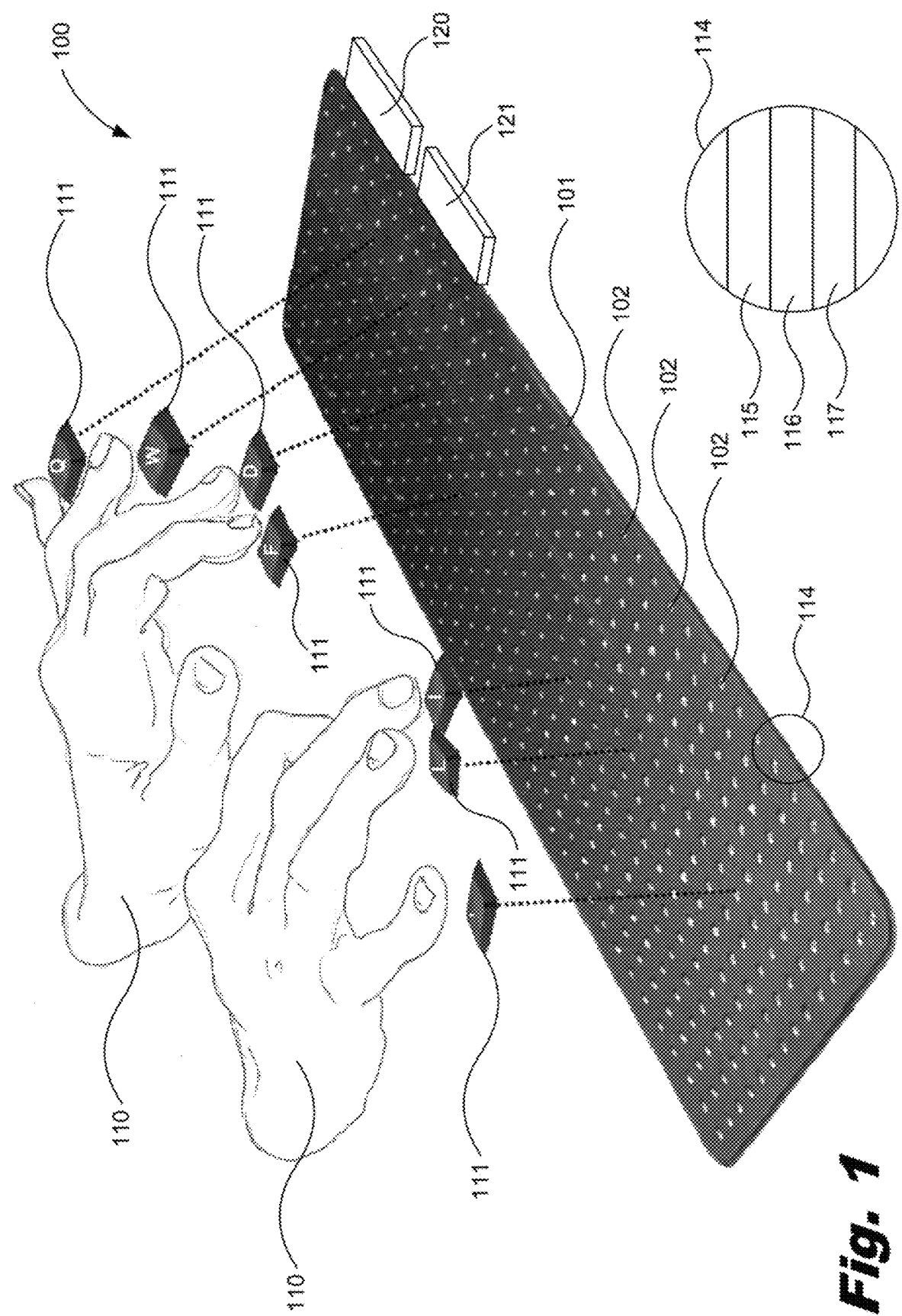
FIG. 1 is a perspective view of the virtual keyboard, according to one example of the principles described herein.

FIG. 1 is a perspective view of the virtual keyboard (100), according to one example of the principles described herein. The user's hands and fingers (110) are depicted in FIG. 1 above the pad (101). A number of keys (111) are depicted in FIG. 1 to depict how movements of the user's hands and fingers (110) over an area, of the pad (101) virtually activate the input of a character or otherwise control a computing device to which the pad (101) is communicatively coupled much like activation of keys (111) of a non-virtual keyboard function.

The pad (101) may be shaped or sized approximately similar to a non-virtual keyboard. In another example, the pad (101) may be larger or smaller than a non-virtual keyboard. A number of sensing devices (102) are included in the pad (101) to detect the presence of the user's hands and fingers (110) over the pad (101), to track the hand and finger movements of the user's hands and fingers (110), and to detect tissue density of the user's hands and fingers (110), to detect palm and fingerprints of the user's hands and fingers (110), and to create and store a keyboard profile of a user, among other functions as will be described in more detail below.

The sensing devices (102) may be located along the surface of the pad (101) as depicted in FIG. 1 in a pattern to provide homogeneous and uniform coverage along the surface of the pad (101). The sensing devices (102) are depicted as bumps along the surface of the pad (101). In one example, the sensing devices (102) may be any type of sensor device that can detect the presence of the user's hands and fingers (110) over the pad (101), track the hand and finger movements of the user's hands and fingers (110), and/or detect a keyboard profile of a user, among other functions. The sensing devices (102) may be, for example, video-based devices that capture video data for processing in the manner described herein, image-based devices that capture image data for processing in the manner described herein, electromagnetic-based devices that use electromagnetic waves and light detectors such as, for example, photodiodes to detect movement, acoustic-based devices such as an ultrasonic-based device that produce acoustical waves and detect the acoustical frequencies reflected from an object, backscatter x-ray devices to detect radiation reflected from the hands and fingers (110), or other types of motion and tracking devices.

As to the ultrasonic-based device, this type of device may detect the position and motion of, the user's hands and fingers (110), a well as the tissue density of the user's hands and fingers (110) for authentication and security purposes. As to the electromagnetic-based devices, this type of device may use light-emitting diodes (LEDs), lasers, infrared light emitters, or other types of electromagnetic wave propagation devices.

In one example, the sensing devices (102) may be protected by a layer of flexible material such as, for example, silicone that allows the pad (101) to be rolled up or folded for storage and mobility. In one example as depicted in the call-out circle (114), the pad (101) may comprise a top layer (115) of silicone, a middle layer (116) in which the sensor devices (102) and associated wiring are disposed, and a bottom layer (117) of silicone. Although the top layer (115) and bottom layer (117) are described as being made of silicone, any other insulating, flexible material may be used to house the array of sensor devices (102) and associated wiring.

The pad (101) may further include a communication module (120) to provide communication with a computing device with which the pad (101) interacts with to manipulate the operation of the computing device. In one example, the communication module (120) may be a wired or wireless communication device. The types of communication utilized by the communication module (120) may include, for example, any communication type that supports any Open Systems Interconnection (OSI) model standardized communication type, any communication type that supports any Institute of Electrical and Electronics Engineers (IEEE) standardized communication type, BLUETOOTH communication types developed by the Bluetooth Special Interest Group, Ethernet communication types, WI-FI communication types as defined by the Wi-Fi Alliance, near field communication types, infrared communication types, among many other types of communications and their respective types of networks, or combinations thereof. The communication module (120) may be embedded within the pad (101) or communicatively coupled to the pad (101) as depicted in FIG. 1.

A power source (121) may also be coupled to the pad (101) to provide electrical power to the pad (101). The power module may provide AC or DC power to the pad. In the example of an AC power source, the power source (121) may be coupled to a wall outlet, the computing device with which the virtual keyboard (100) communicates, or other AC power supply. In the example of a DC power source, the power source may comprise a battery, a rechargeable battery, or other type of DC power supply. The power source (121) may also be a solar panel that directly powers the virtual keyboard (100) or indirectly powers the virtual keyboard (100) through charging a battery, for example.

In one example, the pad (101) of the virtual keyboard (100) may be built into or installed in a user's desk, a wall, the dashboard of a car, or other fixture.

Figure 2:
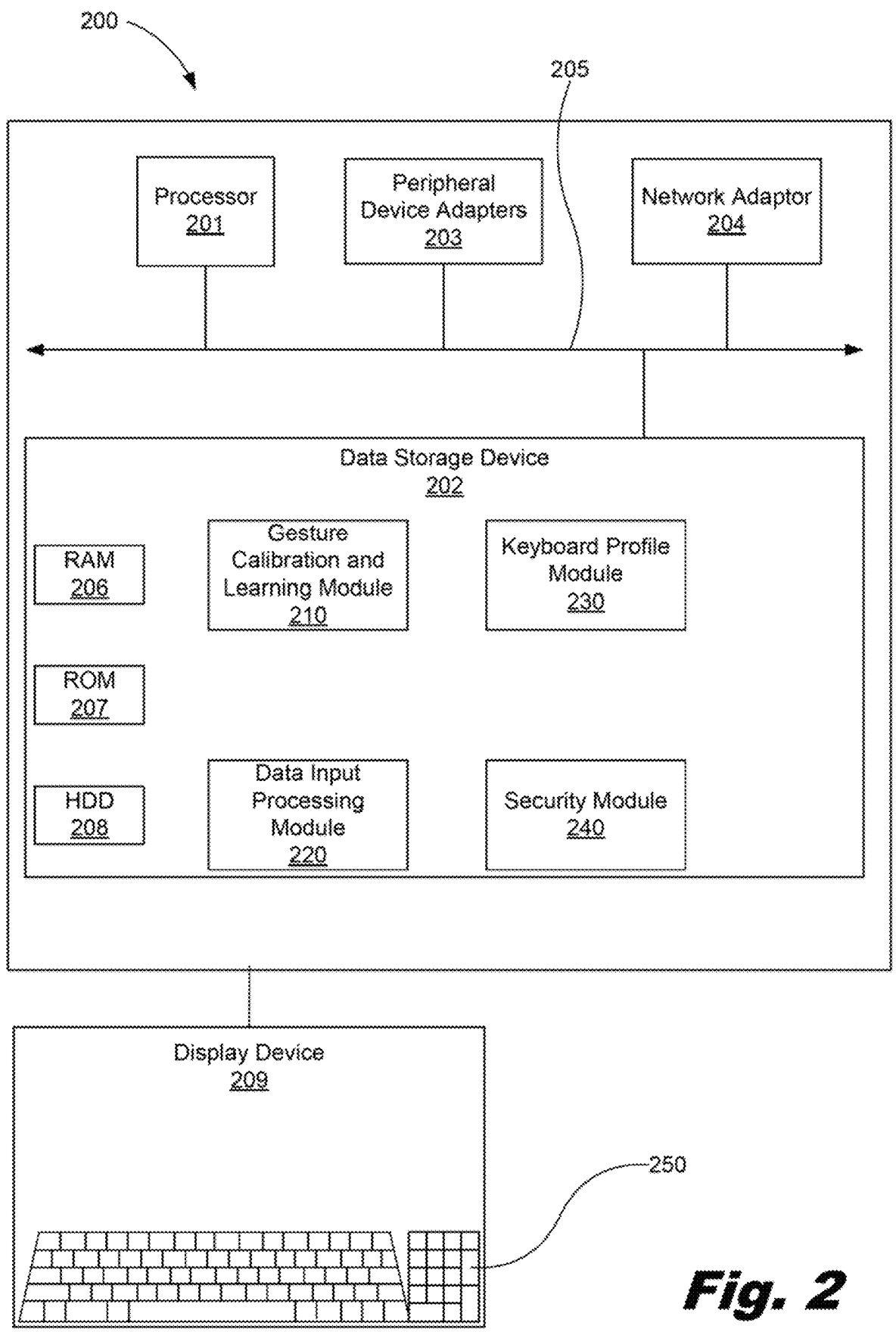
FIG. 2 is a block diagram of a virtual input computing system for processing data obtained from the virtual keyboard of FIG. 1, according to one example of the principles described herein.

FIG. 2 is a block diagram of a virtual input computing system (200) for processing data obtained from the virtual keyboard (100) of FIG. 1, according to one example of the principles described herein. The virtual input computing system (200) may be incorporated into the pad (101) of the virtual keyboard (100), may be a coupled to the virtual keyboard (100), may be a standalone computing device, or may be incorporated into a computing device to which, the virtual keyboard (100) is communicatively coupled. In the example where the virtual input computing system (200) is incorporated into a computing device to which the virtual keyboard (100) is communicatively coupled, the various computing elements and resources provided by the virtual input computing system (200) may be part of the computing device, and the modules comprising executable program code used in the implementation of the virtual keyboard (100) and its associated functions may be stored within a data storage device of the computing device.

The virtual input computing system (200) may be utilized in any data processing scenario including, stand-alone hardware, mobile applications, through a computing network, or combinations thereof. Further, the virtual input computing system (200) may be used in a computing network, a public cloud network, a private cloud network, a hybrid cloud network, other forms of networks, or combinations thereof. In one example, the methods provided by the virtual input computing system (200) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the virtual input computing system (200) are executed by a local administrator.

To achieve its desired functionality, the virtual input computing system (200) comprises various hardware components. Among these hardware components may be a number of processors (201), a number of data storage devices (202), a number of peripheral device adapters (203), and a number of network adapters (204). These hardware components may be interconnected through the use of a number of busses and/or network connections. In one example, the processor (201), data storage device (202), peripheral device adapters (203), and a network adapter (204) may be communicatively coupled via a bus (205).

The processor (201) may include the hardware architecture to retrieve executable code from the data storage device (202) and execute the executable code. The executable code may, when executed by the processor (201), cause the processor (101) to implement at least the functionality of detect the presence of the user's hands and fingers (110) over the pad (101), track the hand and finger movements of the user's hands and fingers (110), detect a keyboard profile of a user, and provide security and access controls to a computing device to which the virtual keyboard (100) is coupled among other functions according to the methods of the present specification described herein. In the course of executing code, the processor (201) may receive input from and provide output to a number of the remaining hardware units.

The data storage device (202) may store data such as executable program code that is executed by the processor (201) or other processing device. As will be discussed, the data storage device (202) may specifically store computer code representing a number of applications that the processor (201) executes to implement at least the functionality described herein.

The data storage device (202) may include various types of memory modules, including volatile and nonvolatile memory. For example, the data storage device (202) of the present example includes Random Access Memory (RAM) (206), Read Only Memory (ROM) (207), and Hard Disk Drive (HDD) memory (208). Many other types of memory may also be utilized, and the present specification contemplates the use of many varying type(s) of memory in the data storage device (202) as may suit a particular application of the principles described herein. In certain examples, different types of memory in the data storage device (202) may be used for different data storage needs. For example, in certain examples the processor (201) may boot from Read Only Memory (ROM) (207), maintain nonvolatile storage in the Hard Disk Drive (HDD) memory (208), and execute program code stored in Random Access Memory (RAM) (206).

The data storage device (202) may comprise a computer readable medium, a computer readable storage medium, or a non-transitory computer readable medium, among others. For example, the data storage device (202) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (203, 204) in the virtual input computing system (200) enable the processor (201) to interface with various other hardware elements, external and internal to the virtual input computing system (200). For example, the peripheral device adapters (203) may provide an interface to input/output devices, such as, for example, display device (209), a mouse, or a non-virtual keyboard in addition to the virtual keyboard (100). The peripheral device adapters (203) may also provide access to other external devices such as an external storage device, a number of network devices such as, for example, servers, switches, and routers, client devices, other types of computing devices, and combinations thereof.

The display device (209) may be provided to allow a user of the virtual input computing system (200) to interact with and implement the functionality of the virtual input computing system (200). In one example, an image of a keyboard (250) may be presented to a user of the virtual keyboard (100) on the display device (209). In this example, the user may input data through the user of the virtual keyboard (100), and the processor (201) may execute code to display to the user keystrokes associated with the hand movements of the user on the keyboard (250) displayed on the display device (209). The peripheral device adapters (203) may also create an interface between the processor (101) and the display device (109), a printer, or other media output devices.

In another example, the display device (209) may display the image of the keyboard (250) on the pad (101). In one example, the image of the keyboard (250) may be displayed on the pad (102) using a projection system to project the image of the keyboard (250) on the pad (101). In another example, a keyboard (250) may not be displayed on the pad (101).

In another example, the image of the keyboard (250) may be displayed on the pad (102) using a number of LEDs embedded within the pad (101). In this example, the LEDs light up to create a pattern in the pad. In one example, the pattern may be the pattern of a keyboard as arranged within a non-virtual keyboard. In another example, the pattern, although arranged similarly to a non-virtual keyboard, may be sized to fit the user's hand sizes, typing patterns, hand positioning, during typing various keystrokes or keystroke combinations, or any hand positioning detected by the virtual keyboard (100) from an initial hand position through any subsequent hand position, keystroke or keystroke combination. Thus, in this example, the image of the keyboard as outlined on the pad (101) through lighting of the LEDs may look significantly different from the tight and inline layout of a non-virtual keyboard and will fit to a user's distinct hand posturing, hand positioning, and keystroke style.

In still another example, the image of the keyboard (250) may be displayed on the pad (102) using a number of laser devices embedded within the pad (101) or that project light onto the pad (101). In this example, the laser devices function in a manner similar to the above-described LEDs. In one example, the display of the keyboard (250) on the display device (209) or the pad (101) as described above may be performed only during a keyboard profile calibration and learning phase as will be described in more detail below in order to assist a user in visualizing placement of keystrokes and help with typing while the user's keystrokes are being learned.

The network adapter (204) may provide an interface to other computing devices within, for example, a network, thereby enabling the transmission of data between the virtual input computing system (200) and other devices located within the network. In an example where the virtual input computing system (200) is incorporated into a computing device to which the virtual keyboard (100) is communicatively coupled, the network adapter (204) provides network connectivity with the virtual keyboard (100).

The virtual input computing system (200) may, when executed by the processor (101), display the number of graphical user interfaces (GUIs) on the display device (109) associated with the executable program code representing the number of applications stored on the data storage device (102). The GUIs may include aspects of the executable code including the displayed keyboard (250) described above. The GUIs may display, for example, a real time indication of which keys are being selected by a user of the virtual keyboard by presenting those keys in an activated state to the user on the GUI displayed on the display device (209). Examples of display devices (209) include a computer screen, a laptop screen, a mobile device screen, a personal digital assistant (PDA) screen, a tablet screen, and a touch screen, among other display devices (106).

The virtual input computing system (200) further comprises a number of modules used in the implementation of the virtual keyboard (100). The various modules within the virtual input computing system (200) comprise executable program code that may be executed separately. In this example, the various modules may be stored as separate computer program products. In another example, the various modules within the virtual input computing system (200) may be combined within a number of computer program products; each computer program product comprising a number of the modules.

The virtual input computing system (200) may include a gesture calibration and learning module (210) to, when executed by the processor (201), calibrate user interactions with the virtual keyboard (100) and learn gestures used by the user in attempting to input data using the virtual keyboard (100). The a gesture calibration and learning module (210) may prompt a user to perform an initial calibration procedure in which the user is requested to demonstrate a number of keystrokes for detection by the pad (101). For example, the user may be prompted to demonstrate a home row hand gesture where the user places his or her hands above the pad (101) and positions his or her fingers as if the user were placing his or her hands and fingers on a home row of a keyboard. This provides the virtual input computing system (200) with data representing a home row position of the user and orients the home row keys and the remainder of the keys on the virtual keyboard (100) with respect to the home row gesture.

The gesture calibration and learning module (210) may also request a user to demonstrate a number of individual keystrokes. For example, the gesture calibration and learning module (210) may request a user to demonstrate keystrokes associated with each of the characters displayed on a keyboard or the keyboard (250) displayed on the display device (209). The gesture calibration and learning module (210) may also request a user to demonstrate a number of combination keystrokes where the user is requested to demonstrate instances where the user would simultaneously press two or more keys on a keyboard. For example, the "shift" key along with the "a" key to produce a capital "A." In this manner, the gesture calibration and learning module (210) may calibrate the virtual keyboard (100) for the user. The calibration is unique to that particular user. The gesture calibration and learning module (210) may also learn a user's distinct hand posturing, hand positioning, and keystroke styles from the outset of that user utilizing the virtual keyboard (100) and throughout the user's use of the virtual keyboard (100). In this manner, the virtual keyboard adapts to the user's potentially changing hand posturing, hand positioning, and keystroke styles.

The gesture calibration and learning module (210) may perform calibration and learning techniques for a number of users of a particular virtual keyboard (100). This is advantageous in situations where a number of individuals have access to a particular computing device via the virtual keyboard (100) such as, for example, in a classroom setting where may groups of students utilize a set of computing devices. In one example, the gesture calibration and learning module (210) may begin calibration and learning for particular user once the user logs onto a computing device coupled to the virtual keyboard (100). Thus, each user that logs into the computing device may be prompted to initiate a calibration and learning sequence to prepare and continue to fine-tune each user's individual and unique keyboard profile. Calibration and learning processes will be described in more detail below.

In one example, the gesture calibration and learning module (210) identifies an initial interaction by the user with the virtual keyboard (100) when the user interacts with any number of sensing devices (102) within the pad (101). The sensing devices (102) of the pad (101) may detect the initial interaction by the user and the gesture calibration and learning module (210) may identify that initial interaction as the position from which the user's keyboard profile is mapped. Thus, if a user presents his or her hands and fingers (110) on a left portion of the pad (101), then the virtual keyboard (100) and gesture calibration and learning module (210) maps the virtual keyboard (100) around the user's hands and fingers (110) from the left portion of the pad (101). In one example, the pad (101) may be larger than a non-virtual keyboard to accommodate for the possibility of this type of off-center initiation.

The virtual input computing system (200) may include a data input processing module (220) to, when executed by the processor (201), process a number of keystrokes a user performs on the virtual keyboard (100). The data input processing module 220) receives input data from the virtual keyboard (100), and identifies a number of the inputs or a series of the inputs as being associated with keystrokes based on the calibrated and learned gestures obtained by the calibration and learning module (210). The data input processing module (220) may submit the identified inputs to a computing device to which the virtual keyboard (100) is coupled for controlling the computing device according to the identified inputs and commands.

The data input processing module (220) of the virtual input computing system (200) may also provide feedback to the user of the virtual keyboard (100). In one example, feedback may be provided to the user as the user types on the virtual keyboard (100). The feedback may be provided in the form of haptic feedback, audio feedback, visual feedback, or other types of feedback that indicate to the user that keystrokes are being made. In the example of haptic feedback, the pad (101) may include a rumble device to provide a tactile response when the user touches a certain portion of the pad (101) if the user were to touch the pad (101) during typing.

In the example of audio feedback, a speaker or other audio device may provide an audible noise when the user makes a keystroke in the space above the pad (101). In this example, the audible noise may mimic the sound of a key on a non-virtual keyboard being pressed, or make any other noise to indicate to the user that their keystrokes are being received by the virtual keyboard (100) and interpreted by the computing device to which the virtual keyboard (100) is coupled.

In the example of visual feedback, the computing device to which the virtual keyboard (100) is coupled may display the a keyboard (250) as described above, and provide feedback to the user that the display device (209) may indicate that keystrokes are being received by the virtual keyboard (100) and interpreted by the computing device to which the virtual keyboard (100) is coupled by changing an aspect of the displayed keyboard (250) such as lighting or filling in a key corresponding to the user's keystrokes.

A keyboard profile module (230) may also be included within the virtual input computing system (200) to, when executed by the processor (201), identify, refine, amend or build on an individual user's unique keyboard profile. As described above, the user's unique keyboard profile may include information regarding the user's distinct hand posturing, hand positioning, and keystroke style. The keyboard profile module (230) may store each user's keyboard profile in memory such as the data storage device (202) or another data storage associated with the virtual keyboard (100).

The virtual input computing system (200) may include a security module (240) to, when executed by the processor (201), provide security to a computing device to which the virtual keyboard (100) is communicatively coupled. The security module (240) may detect an initial presence of a user's hands and fingers (110) over the pad (101) and within the detection range of the sensor devices (102). Once the user's hands and fingers (110) are detected, the security module (240) analyzes the user's hand posturing, hand positioning, keystroke style, the tissue density of the user's hands and fingers, the user's palm and fingerprints, other aspects of the movement and characteristics of the user's hands and fingers (110), and combinations thereof. Based on this analysis, the security module (240) compares these collected aspects of the user's hands and fingers (110) with keyboard profiles stored in memory. If the collected aspects of the user's hands and fingers (110) match a keyboard profile stored in memory, then the user is allowed access to the computing resources of the computing device to which the virtual keyboard (100) is communicatively coupled.

The security module (240) may also lock out a subsequent individual who attempts to gain access to the computing device while a first user is utilizing the virtual keyboard (110) and the computing device. For example, if a first user is logged onto the computing device and walks away from the computing device, the subsequent user's hand posturing, hand positioning, keystroke style, the tissue density of the subsequent user's hands and fingers, the subsequent user's palm and fingerprints, other aspects of the movement and characteristics of the subsequent user's hands and fingers (110) will not be recognized as the first user's keyboard profile and/or will not be recognized as a keyboard profile stored in memory. In this scenario, the virtual keyboard (100) and the computing device will lock up or otherwise deny access. Once the first user who is authorized to access the computing device via the virtual keyboard (100) once again place his or her hands and fingers (110) over the pad (101) and within the detection range of the sensor devices (102) to compares the first user's collected aspects of the user's hands and fingers (110) with keyboard profiles stored in memory and provides access to the first user. Thus, the security module (240) detects an unauthorized keyboard profile, locks the computing device, and prompts a user to authenticate his or herself.

The modules described above (210, 220, 230, 240) may utilize a number of technologies to detect and track movement of the user's hands and fingers (110) above or within the vicinity of the pad (101). In one example, the modules (210, 220, 230, 240) may use motion tracking hardware and software developed and distributed by Leap Motion, Inc.

Software and drivers associated with the modules (210, 220, 230, 240) may be obtained from a network using the network adaptor (204), from a disk, or any other source. More details in connection with the calibration and learning module (210), the data input processing module (220), the keyboard profile module (230), and the a security module (240) will now be described in more detail in connection with FIGS. 3 through 5.

Figure 3:
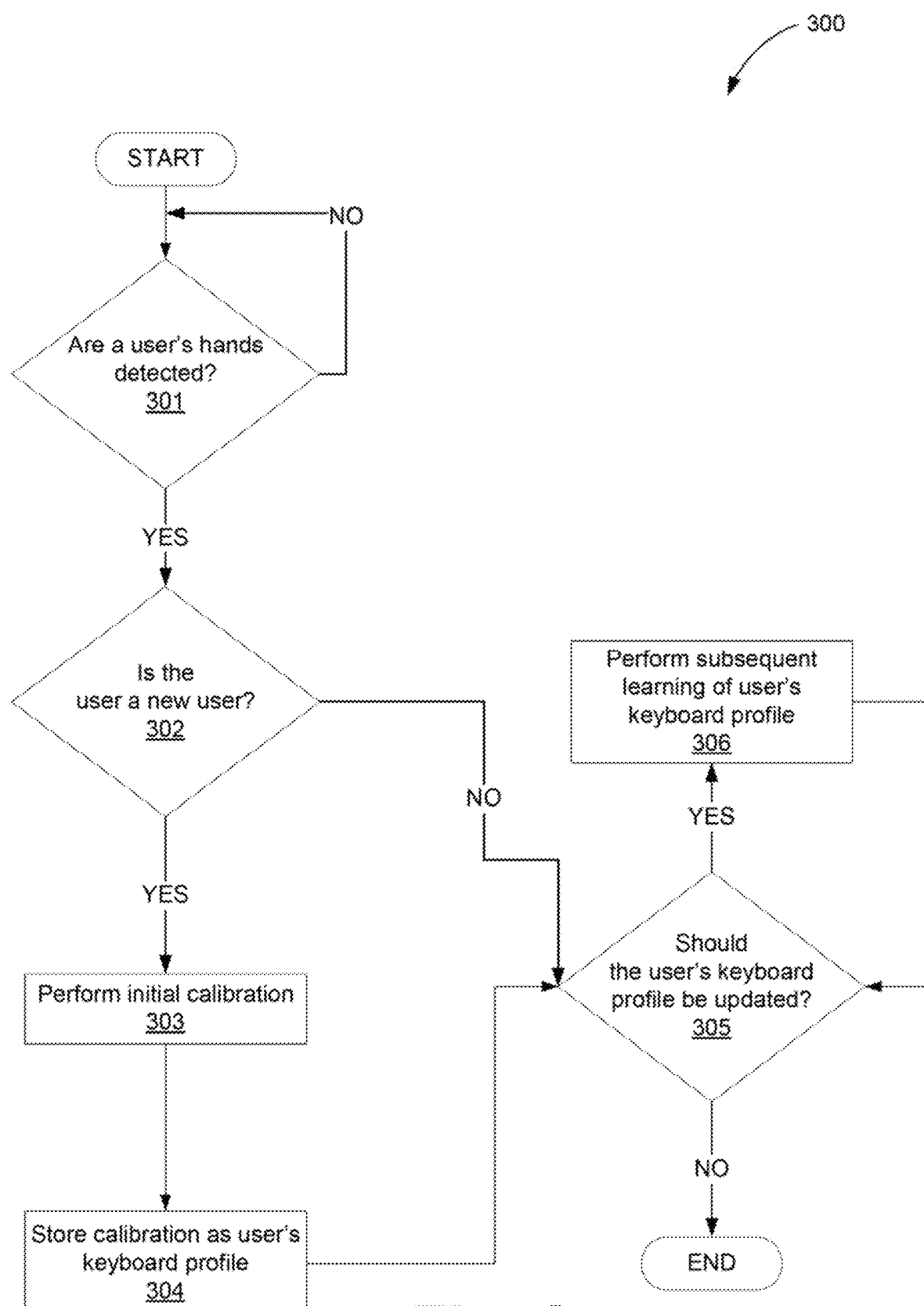
FIG. 3 is a flowchart showing a method of calibrating the virtual keyboard, according to one example of the principles described herein.

FIG. 3 is a flowchart showing a method (300) of calibrating the virtual keyboard (100), according to one example of the principles described herein. The method of FIG. 3 may include determining (block 301), with the processor (201) executing the gesture calibration and learning module (210), whether the user's hands are detected. This determination (block 301) may be a condition by which waking the virtual keyboard and/or the computing device is achieved. If the user the user's hands are not detected (block 301, determination NO), then the method (300) loops back to determining (block 301) whether the user's hands are detected. If the user's hands are detected (block 301, determination YES), then the processor (201) executing the gesture calibration and learning module (210), determines (block 302) whether the user is a new user of the virtual keyboard (100). If the user is a new user of the virtual keyboard (100) (block 302, determination YES), then the processor (201) executing the gesture calibration and learning module (210), performs (block 303) an initial calibration of the user's hand posturing, hand positioning, and keystroke style.

For example, at block 303, the gesture calibration and learning module (210) may prompt a user to demonstrate a home row hand gesture where the user places his or her hands above the pad (101) and positions his or her fingers as if the user were placing his or her hands and fingers on a home row of a keyboard as described above. This provides the virtual input computing system (200) with data representing a home row position of the user and orients the home row keys and the remainder of the keys on the virtual keyboard (100) with respect to the home row gesture. The gesture calibration and learning module (210) may also prompt a user to demonstrate a number of individual keystrokes and a number of combination keystrokes as described above.

The gesture calibration and learning module (210) may also learn a user's distinct hand posturing, hand positioning, and keystroke styles from the outset of that user utilizing the virtual keyboard (100) and throughout the user's use of the virtual keyboard (100). In this manner, the virtual keyboard adapts to the user's potentially changing hand posturing, hand positioning, and keystroke styles.

The gesture calibration and learning module (210) may perform calibration and learning techniques for a number of users of a particular virtual keyboard (100). This is advantageous in situations where a number of individuals have access to a particular computing device via the virtual keyboard (100) such as, for example, in a classroom setting where may groups of students utilize a set of computing devices. In one example, the gesture calibration and learning module (210) may begin calibration and learning for a particular user once the user logs onto a computing device coupled to the virtual keyboard (100). Thus, each user that logs into the computing device may be prompted to initiate a calibration and learning sequence to prepare and continue to fine-tune each user's individual and unique keyboard profile. Calibration and learning processes will be described in more detail below.

The gesture calibration and learning module (210) and keyboard profile module (230), when executed by the processor, may store (block 304) the calibration from block 303 as the user's keyboard profile. The user's keyboard profile may be data representing the detected hand posturing, hand positioning, and keystroke styles, among other aspects of the user's hand movements as detected by the sensing devices (102) of the pad (101). The user's keyboard profile may be stored in the memory located at the virtual keyboard (100), in the data storage device (202) of the virtual input computing system (200), or another storage device accessible by the processor (201), the virtual keyboard (100) or other processing device for use in execution of the various functions of the present systems and methods.

If the user is a not new user of the virtual keyboard (100) (block 302, determination NO), or after performing an initial calibration (block 303), then the gesture calibration and learning module (210) may determine (block 305) if the user's keyboard profile should be updated. A number of aspects of the user's hand posturing, hand positioning, and keystroke style may change through time as the user becomes more comfortable using the virtual keyboard (100). A number of criteria may indicate that a user's keyboard profile should be updated including, for example, changes in initial home row positioning, changes in keystrokes or keystroke combinations, or other nuanced changes in the user's hand posturing, hand positioning, and keystroke style. Further, the user's keyboard profile may be updated upon identification by the sensing devices (102) that an injury such as a loss of a portion of the user's hand or the loss of a finger has cause the user accommodate in order to make keystrokes or present a particular hand position. Thus, the gesture calibration and learning module (210) continues to learn the user's hand posturing, hand positioning, and keystroke style by performing (block 303) subsequent learning of the user's keyboard profile if it is determined that the user's keyboard profile should be updated (block 305, determination YES).

The method (300) loops back to blocks 305 and 306 as long a it is determined that the user's keyboard profile should be updated (block 305, determination YES). The method may terminate if it is determined that the user's keyboard profile should not be updated (block 305, determination NO). In this manner, the user's keyboard profile may be initially created and continually updated to accommodate the user's changing hand posturing, hand positioning, and keystroke style.

Figure 4:
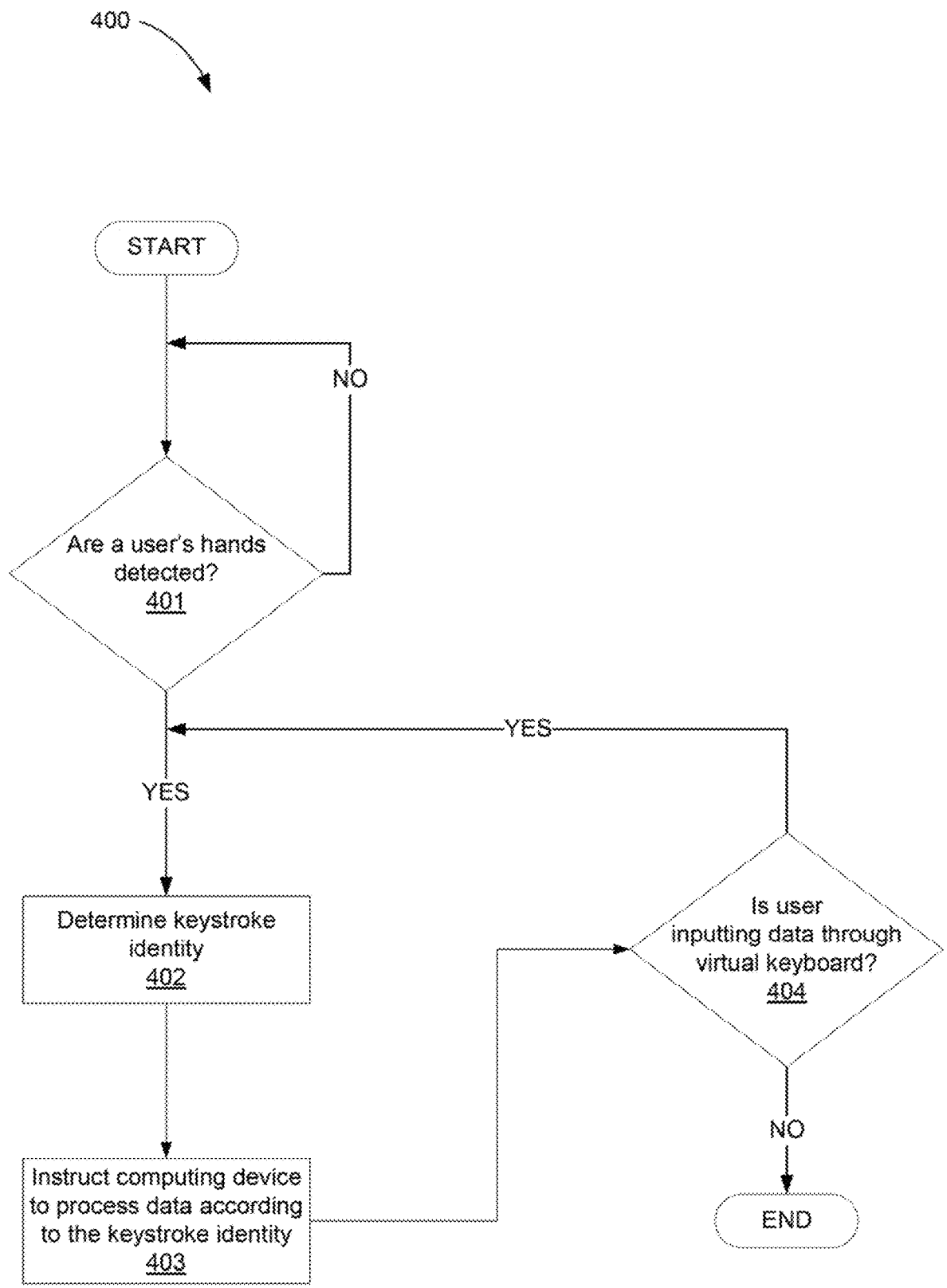
FIG. 4 is a flowchart showing a method of processing signals from the virtual keyboard, according to one example of the principles described herein.

FIG. 4 is a flowchart showing a method (400) of processing signals from the virtual keyboard (100), according to one example of the principles described herein. The method of FIG. 4 may include determining (block 401), with the processor (201) executing the data input processing module (220), whether the user's hands are detected. If the user the user's hands are not detected (block 401, determination NO), then the method (400) loops back to determining (block 401) whether the user's hands are detected. Again, this determination (block 401) may be a condition by which waking the virtual keyboard and/or the computing device is achieved. If the user's hands are detected (block 401, determination YES), then the processor (201), executing the data input processing module (220), determines keystroke identity based on the user's keyboard profile identified in FIG. 3. The keystroke identity identifies the how the user's hand posturing, hand positioning, and keystroke style correlate with input to the computing device to which the virtual keyboard is communicatively coupled.

Using the keystroke identity, the data input processing module (220), when executed by the processor (201), instructs (block 403) the computing device to process data in accordance with the keystroke identity, in this manner, the user's input at the virtual keyboard (100) is translated into computer readable instructions that are consumed by the computing device in order to perform the tasks the user wishes the computing device to perform such as, for example, typing in a word processing application, or any other application of user input from a keyboard.

The method may continue by determining (block 404) whether the user is inputting data though the virtual keyboard (100). If the user is still utilizing the virtual keyboard (100), then those keystrokes should be identified and translated into computer readable instructions for consumption by the computing device in order to perform the tasks the user wishes the computing device to perform. Thus, if the user is inputting data though the virtual keyboard (100), then the method (400) of FIG. 4 may loop back to block 402 for processing as described above. If the user is not inputting data though the virtual keyboard (100), then the method (400) may terminate.

Figure 5:
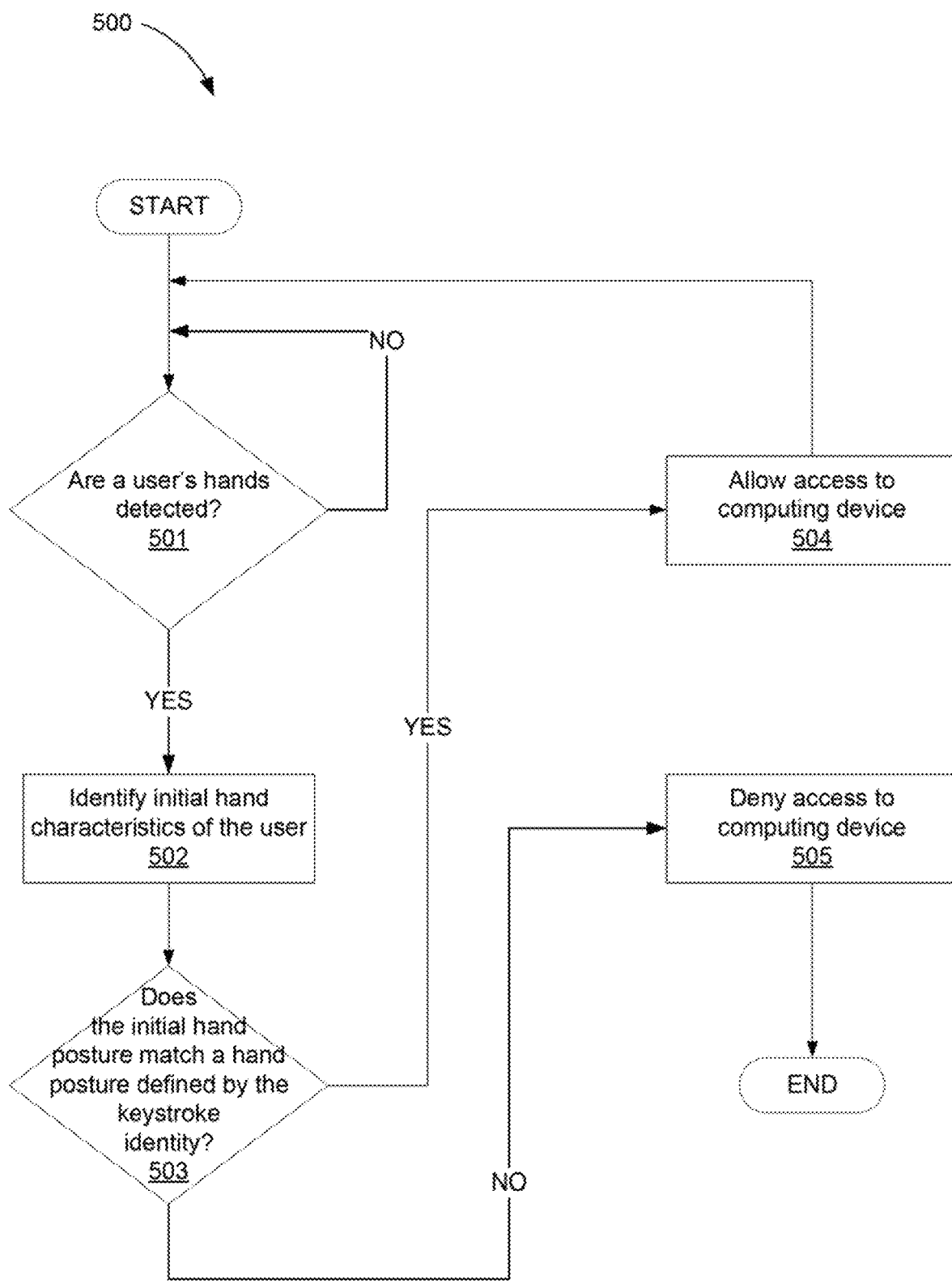
FIG. 5 is a flowchart showing a method of processing authentication signals from the virtual keyboard, according to one example of the principles described herein.

FIG. 5 is a flowchart showing a method (500) of processing authentication signals from the virtual keyboard (100), according to one example of the principles described herein. As described above, the virtual keyboard (100) may be used to permit access to individuals who are permitted to use a computing device to which the virtual keyboard (100) is communicatively coupled, while denying access to others who are not permitted. The method of FIG. 5 may include determining (block 501), with the processor (201) executing the security module (240), whether the user's hands are detected. Again, this determination (block 501) may be a condition by which waking the virtual keyboard and/or the computing device is achieved. If the user the user's hands are not detected (block 501, determination NO), then the method (500) loops back to determining (block 501) whether the user's hands are detected. If the user's hands are detected (block 501, determination YES), then the processor (201) executing the security module (240), identifies (block 402) an initial hand characteristics of the user attempting to access the computing device via the virtual keyboard (100).

The method (500) of FIG. 5 may continue by the processor (201) executing the security module (240) to determine (block 503) if the initial hand characteristics match a number of hand characteristics defined by a keystroke identity such as the keystroke identity defined and stored at blocks 303 and 304 of FIG. 3. In one example, the initial hand characteristics may be compared to the keystroke identity of an individual currently logged into the computing device. In this example, a user who is authorized to access the computer, but is not the current user of the computer may still be denied access. In another example, the processor (201) may compare the initial hand characteristics to the keystroke identity of a number of users. If the initial hand characteristics match hand characteristics defined by a keystroke identity (block 503, determination YES), then access to the computing device may be allowed. The method (500) may loop back to block 501 to ensure that every time a user's hands are detected, that this security measure may be performed. The hand characteristics compared at block 503 may include, hand movements, hand sizes, hand posturing, hand positioning, and keystroke style, tissue density of the user's hands and fingers (110), palm prints, fingerprints, among many other characteristics of the user's hands and fingers as detected by the sensing devices (102), or combinations thereof.

If, however, the initial hand posture does not match a hand posture defined by a keystroke identity (block 503, determination NO), then the processor (201), executing the security module (240) may deny access (block 505) to the computing device. Denying access to the computing device may include, for example, not registering input from the virtual keyboard (100), locking the computing device, shutting down the computing device, alerting a valid user or an administrator of an unauthorized access to the computing device, requesting the accessing user for additional credentials such as a password or fingerprint identification, other security measures, or combinations thereof. The method (500) of FIG. 5 may terminate, and may be initiated once again when a user's hands are detected at block 501.

In this manner, the virtual keyboard (100) may be used to provide access control and security to any computing device. These computing devices may include, for example, desktop computers, laptop computers, tablet computers, mobile phone devices, as well as objects or devices that user computing devices such as vehicles, automated teller machines (ATMs), buildings, musical instruments such as keyboards, checkout stands at retail stores, among many other devices and objects.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (201) of the virtual input computing system (200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a virtual keyboard. The virtual keyboard includes a pad, a number of motion sensors coupled to the pad to detect the presence of a user's hands over the pad, and a tracking system to track hand and finger movements of the user's hand. A computing device for processing input from a virtual keyboard is also described. The computing device includes a processor and a memory. The memory includes executable code that, when executed by the processor initiates a tracking system to track hand and finger movements of the user's hand, in response to receiving data from a number of motion sensors coupled to a pad of the virtual keyboard to detect the presence of a user's hands over the pad. The executable code also calibrates the virtual keyboard based on a number of criteria of the user's hand.

This virtual keyboard may have a number of advantages, including: (1) the virtual keyboard is easy to store by rolling it up, folding it, or laying it on top of a computing device for storage; (2) due to its virtual aspects, a user need not come in physical contact with his or her fingers or hands to operate the virtual keyboard; (3) the virtual keyboard conforms to a user's hand positions and learns from the user's usage patterns to increase comfort and utility; and (4) the virtual keyboard provides increased security to a computing device to which the virtual keyboard is communicatively coupled, among many other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A virtual keyboard comprising:
a pad;
a number of motion sensors coupled to the pad to detect a presence of a user's hands over the pad;
a processor, and
a memory, the memory comprising executable code that, when executed by the processor;
calibrates the virtual keyboard based on a number of criteria of the user's hands detected by the number of motion sensors, wherein the number of criteria includes a home row position of the user's hands and fingers as if the user was placing the fingers on a home row of an actual keyboard, wherein the calibrating includes storing the number of criteria as the user's unique keyboard profile, and orientating home row keys and a remainder of keys on the virtual keyboard according to the detected home row position; and
responsive to the user subsequently using the virtual keyboard after the calibration, receive inputs from the virtual keyboard, and identify a number of the inputs or a series of the inputs as being associated with keystrokes based on the home row position of the user determined from the calibration.

2. The virtual keyboard of claim 1, in which detection of the user's hands by the motion sensors activates a tracking system.

3. The virtual keyboard of claim 2, in which the tracking system comprises a number of wave detectors to detect wavelengths reflected off the user's hands.

4. The virtual keyboard of claim 1, in which the pad is dimensioned to approximate a size of a keyboard.

5. The virtual keyboard of claim 1, further comprising a tracking system to track hand and finger movements of the user's hand.

6. The virtual keyboard of claim 1, in which the user's unique keyboard profile comprises hand position, hand size, hand posturing, keystroke style, or combinations thereof.

7. The virtual keyboard of claim 1,
wherein the executable code, when executed by the processor;
stores an authentication profile based on a plurality of the number of criteria of the user's hands;
builds a hand position profile for a subsequent user of the virtual keyboard;
authenticates the subsequent user responsive to the hand position profile matching the authentication profile; and
restricts access to computing resources of a computing device to which the pad is communicatively coupled responsive to the hand position profile hand not matching the authentication profile.

8. The virtual keyboard of claim 7, in which access to a computing device to which the pad is communicatively coupled is denied if the hand position profile is not recognized.

9. A computing device for processing input from a virtual keyboard, comprising:
a processor; and
a memory, the memory comprising executable code that, when executed by the processor;
initiates a tracking system to track hand and finger movements of a user's hands in response to receiving data from a number of motion sensors coupled to a pad of the virtual keyboard to detect the presence of the user's hands over the pad;
calibrates the virtual keyboard based on a number of criteria of the user's hands detected by the number of motion sensors, wherein the number of criteria includes a home row position of the user's hands and fingers as if the user were placing the fingers on a home row of an actual keyboard, wherein the calibrating orients home row keys and a remainder of keys on the virtual keyboard according to the detected home row position; and responsive to the user subsequently using the virtual keyboard after the calibration, receive inputs from the virtual keyboard, and identify a number of the inputs or a series of the inputs as being associated with keystrokes based on the home row position of the user determined from the calibration.

10. The computing device of claim 9, in which the memory further comprises executable code that, when executed by the processor:
  stores an authentication profile based on a plurality of the number criteria of the user's hands;
  builds a hand position profile for a subsequent user of the virtual keyboard;
  authenticates the subsequent user responsive to the hand position profile matching the authentication profile; and
  restricts access to computing resources of a computing device to which the pad is communicatively coupled responsive to the hand position profile hand not matching the authentication profile.

11. The computing device of claim 9, in which the virtual keyboard comprises:
  the pad;
  the number of motion sensors coupled to the pad to detect the presence of the user's hands over the pad; and
  the tracking system to track hand and finger movements of the user's hand.

12. The computing device of claim 9, further comprising:
  a display system, in which a number of keys of a keyboard are displayed on the pad using the display system.

13. A non-transitory computer readable medium storing machine readable instructions executable by a processor in association with a virtual keyboard, the machine readable instructions executable by the processor to:
  with a number of motion sensors coupled to a pad, detect a user's hands above the pad;
  calibrate the virtual keyboard based on criteria of the user's hands detected by the number of motion sensors, wherein the number of criteria includes a home row position of the user's hands and fingers as if the user were placing the fingers on a home row of an actual keyboard; and
  responsive to the user subsequently using the virtual keyboard after the calibration, receive inputs from the virtual keyboard, and identify a number of the inputs or a series of the inputs as being associated with keystrokes based on the home row position of the user determined from the calibration.

14. The non-transitory computer readable medium of claim 13, wherein the machine readable instructions are executable by the processor to:
  with a number of lasers, track movements of the hands;
  based on information transmitted from the motion sensors and the lasers, build an authentication hand position profile for the user for user authentication;
  perform user authentication for a subsequent user of the virtual keyboard based on the authentication hand position profile and hand position information for the subsequent user that is determined based on detection of the subsequent user's hands by the number of motion sensors; and
  restrict access to computing resources of a computing device to which the pad is communicatively coupled responsive to determining the hand position information for the subsequent user does not match the authentication hand position profile.

\* \* \* \* \*